C. W. GERHART.
DEMOUNTABLE WHEEL HUB.
APPLICATION FILED DEC. 10, 1912.
1,105,073.
Patented July 28, 1914.
2 SHEETS—SHEET 1.
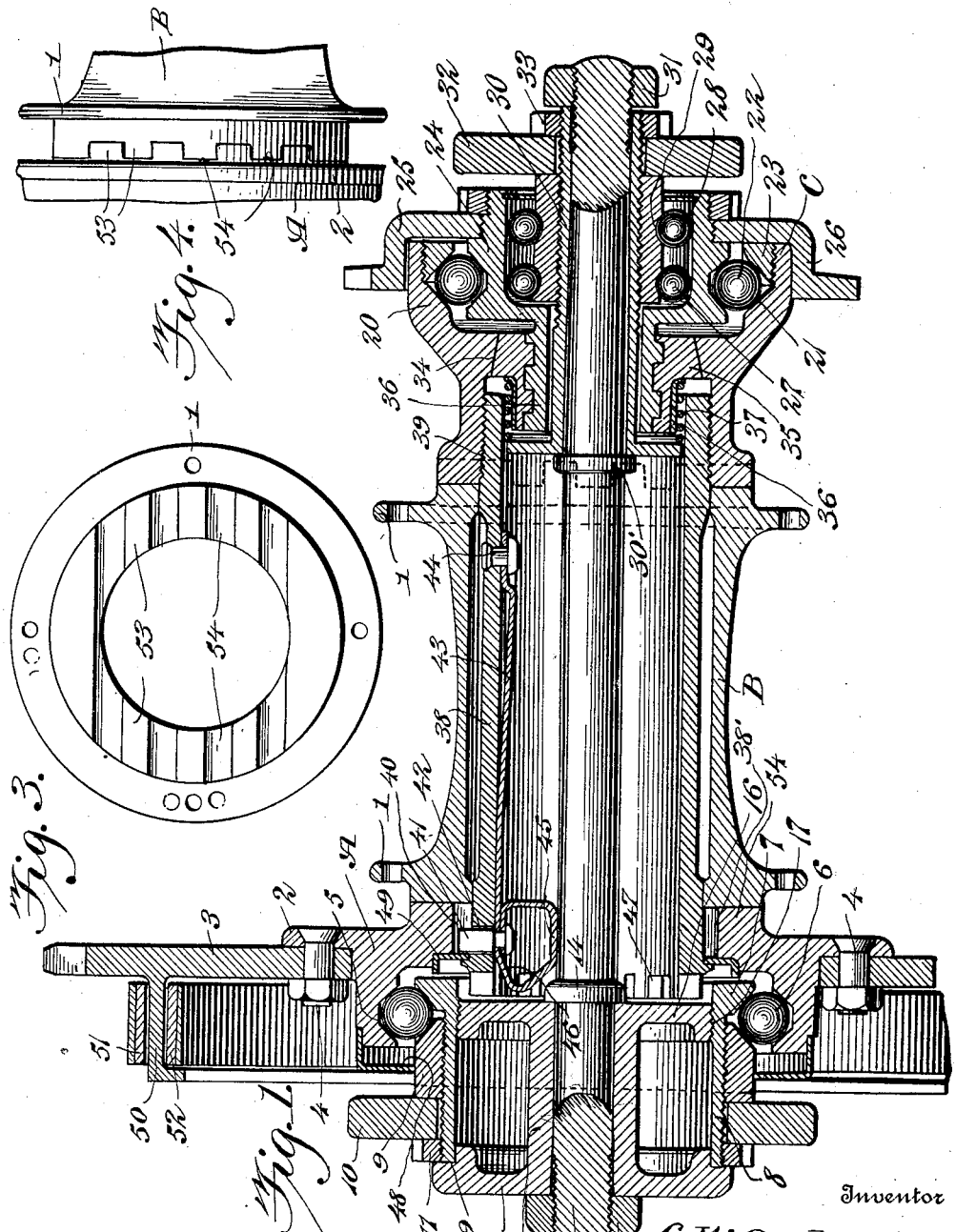

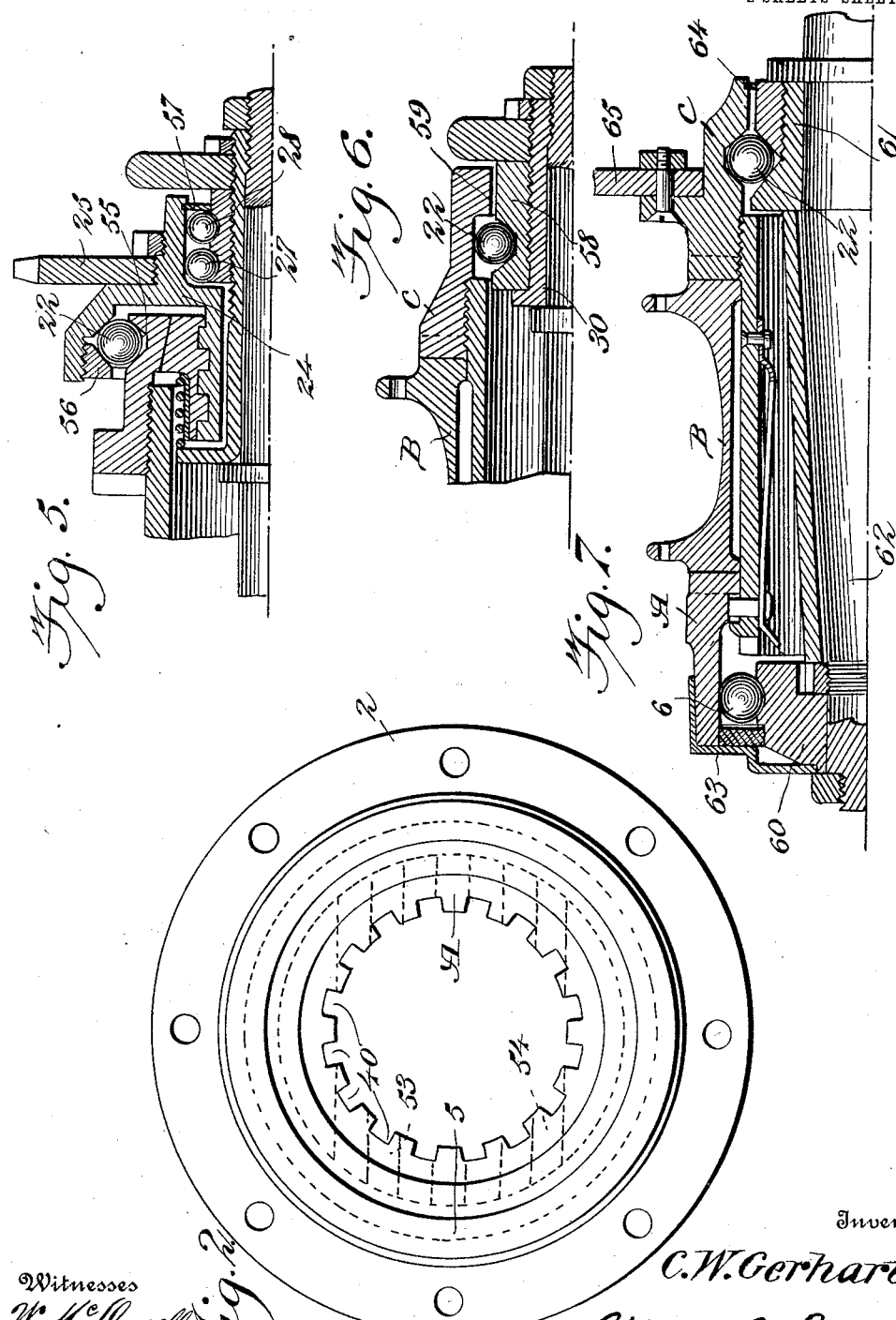

UNITED STATES PATENT OFFICE.

CHARLES W. GERHART, OF MOUNT HOLLY SPRINGS, PENNSYLVANIA.

DEMOUNTABLE WHEEL-HUB.

1,105,073.   Specification of Letters Patent.   Patented July 28, 1914.

Application filed December 10, 1912. Serial No. 735,996.

*To all whom it may concern:*

Be it known that I, CHARLES W. GERHART, a citizen of the United States, residing at Mount Holly Springs, in the county of Cumberland and State of Pennsylvania, have invented new and useful Improvements in Demountable Wheel-Hubs, of which the following is a specification.

This invention relates to demountable wheels and hubs, the main object of the invention being to provide means whereby the wheel proper, together with a section of the hub on which the wheel is built up, may be detached from and reattached to the remainder of the hub, without disturbing the portions of the hub which are connected to and supported by the machine frame.

The present invention is especially designed for use in connection with motor-cycles, foot propelled vehicles, and mechanically propelled vehicles embodying two, three or four wheels, one or more of which are driving wheels, and to which motion is imparted by means of driving belts, chains or shafts, either from a pedal operated or motor operated driving shaft.

In vehicles of the class described, it is sometimes necessary to repair or replace a tire, and for this purpose it is preferable to remove the wheel, together with its tire, from the machine frame, thereby disarranging the adjustment of the bearings, and also, if it be a driving wheel, the axle and the driving belts, chains, or shaft. After replacing the tire in the rim, all of the parts just referred to have to necessarily be readjusted, thus throwing much unnecessary labor on the operator, and consuming much time.

In the case of side-cars and vehicles of a like nature, this invention makes possible the carrying of an extra wheel, with tire, that may replace any disabled wheel or tire with the minimum amount of labor and time.

The main object of the present invention is to overcome the difficulty and loss of time referred to, and enable the wheel and the portion of the hub upon which the wheel is built up to be removed and replaced without in any way disturbing or disarranging the adjustment of the parts.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a longitudinal diametrical section through a wheel hub, embodying the present invention, showing portions of the frame in section, in which the hub is mounted. Fig. 2 is an outside face view of one of the end hub sections carrying the main driving sprocket wheel. Fig. 3 is an end view of the intermediate or middle section of the hub. Fig. 4 is a detail plan view, showing the interfitting relation between one of the end sections of the hub and the intermediate section thereof. Fig. 5 is a detail diametrical section through the pedal sprocket end of the hub, showing a slight modification in the formation and arrangement of parts. Fig. 6 is a section similar to Fig. 5, showing the construction and arrangement of parts in case the pedal sprocket wheel is dispensed with. Fig. 7 is a longitudinal section similar to Fig. 1, showing a hub especially designed for use on side or auxiliary cars, or cycles having more than two wheels.

The hub contemplated in this invention is of sectional construction and embodies the sections A, B and C, A and C designating the end sections of the hub, and B the intermediate or middle section thereof.

The section B is provided with the spoke flanges 1, to which the spokes of the wheel are connected, it being understood that the wheel, including the spokes and rim are built up on the intermediate hub section B, which is adapted to be removed or detached from the other sections without disturbing the latter, in a manner hereinafter particularly described.

A designates the main driving sprocket hub section, and for that purpose it is provided with a flange 2, to which the rim section 3 of the driving sprocket wheel is secured by means of bolts 4, or the equivalent thereof. The section A is also extended to form a ball cup 5, in which are anti-friction balls 6 which travel in contact with an inside cone 7 having an outwardly extending and externally threaded sleeve 8, upon which is threaded the outside cone 9, the cones 7 and 9 serving to confine the balls 6, so that said balls will not only sustain the load, but also take up end thrust in both directions.

The sleeve 8 passes through a slot in the frame member 10 of the machine, the cone 9 fitting up against the frame at the inner side thereof, and the parts being secured by means of an outside nut 11 threaded upon the sleeve 8.

The sleeve 8, together with the cone 7 at the inner end thereof, is supported and centered by a spacer nut 12 which surrounds the axle 13, the latter extending entirely through the sectional hub, as shown in Fig. 1. The spacer nut 12 is held between a fixed collar 14 on the axle and a removable nut 15 which bears against the outer side of the spacer nut 12. This spacer nut comprises an inner web 16, which is externally threaded, as shown at 17, to receive the combined cone 7 and sleeve 8, and is provided at its outer end with another web 18 which is rabbeted and shouldered, as shown at 19, to receive the outer end of the sleeve 8.

The other end section C of the wheel hub is extended to form a flange 20 containing a cone face 21, against which travel anti-friction balls 22, said balls being held in place by a cone 23 threaded into the cup formed by the flange 20. The balls 22 travel around in contact with the inner or hub section 24 of a pedal sprocket wheel 25 which is offset inwardly, as shown at 26, to extend around the flange 20. The hub 24 is bored to receive one or two series of smaller anti-friction balls 27 and 28, which travel in runways in a bearing sleeve 29 which is threaded upon a tubular skein 30 which surrounds the adjacent end of the axle 13, said skein being held between a fixed collar 30' on the axle and a removable nut 31 at the outer end thereof. 32 designates the frame member at that end of the axle, the same being secured fast between the bearing sleeve 29 and a nut 33 threaded on the outer end of said skein, as shown.

The section C is provided interiorly with a tapered clutch face 34, within which is a slidable cone-shaped clutch 35 internally threaded to receive a clutch screw 36 formed integrally with the hub section 24 of the sprocket wheel 25, the operation being such that when the sprocket wheel 25 is driven forward, the cone-shaped clutch 35 is forced into binding engagement with the tapered face 34 of the hub section C, thereby taking up the hub and causing a forward rotation of the wheel under the action of the pedals. This enables the machine to be driven forward by pedal action. When the machine is back pedaled, the clutch faces are caused to separate, thereby leaving the hub of the wheel free to turn as in coasting.

36' designates a thin sleeve loosely surrounding the clutch 35 and forming a support for an expansion spring 37 which serves to lightly press at one end against the clutch 35, and against the stationary skein 30 at the other end, thereby producing a certain amount of friction and tending to hold the clutch from revolving to a certain extent, so that the thread may more readily take hold.

In order to lock the hub sections together, and cause them to rotate as a unit, I provide a coupling sleeve 38 which is threaded at one end, as shown at 39, to screw into the corresponding internally threaded portion of the hub section C. At the opposite end, the hub section B is provided with a shoulder 38' which bears against a suitable face on the driving hub section A, as best illustrated in Figs. 1 and 2. The driving hub section A has notches or shoulders 40, within its bore, intended to receive a locking pin 41 which works through an opening 42 in the sleeve 38, near one end thereof, and is carried by a spring 43 which is secured, at 44, to the inside of the sleeve 38, and has its outer end formed into a loop 45, one portion of which is adapted to rest close to the axle 13, when the latter is in place, while another portion 46 of said loop is beveled or inclined, as shown, so that when a suitable implement made especially for the purpose is inserted through the space left by the removal of the spacer nut 12, a beveled portion of said implement will engage the inclined shoulder 46 and force the same inward, so as to disengage the pin 41 from the notch 40 in which it has been lying. At the same time, the implement is provided with teeth which engage teeth or notches 47 provided at the extreme edge of the sleeve 38, as clearly illustrated. By then turning the sleeve by means of such an implement as that referred to, the sleeve is moved out of threaded engagement with the section C of the hub, enabling it to be withdrawn through the sleeve 8.

48 designates a dust guard for preventing admission of dust to the balls 6, and 49 designates another dust guard shutting off admission of dust to the bearings 6 from the opposite side. The driving sprocket 3 is shown as provided with a brake flange 50 adapted to receive the application of external and internal brake bands 51 and 52.

In order to demount the wheel, which, as previously indicated, is built up on the intermediate section B of the hub, the nut 31 is first removed from the end of the axle 13. The spacer nut 12 is then removed from the opposite end of the hub carrying with it the axle. The special implement referred to above is then inserted in the space previously occupied by the spacer nut 12, and brought into engagement with the teeth or notches 47, and also caused to operate against the inclined face 46 of the loop carrying the spring 43 to which the locking pin 41 is attached. This causes a withdrawal of the locking pin 41 which enables the sleeve 38 to be turned, until it is moved out of threaded engagement with the section C of the hub and entirely withdrawn. This permits the intermediate section B of the hub to be withdrawn from between the sections A and C. When these hub sections are all combined, they have an interlocked engagement at their abutting faces, as shown in Figs. 3 and 4, the said abutting faces being provided with tongues 53 and grooves 54, and it will be noted that these tongues and grooves all extend in parallel planes, which, while providing an interfitting or interlocking engagement between the sections, permits the intermediate section B to be drawn outwardly from between the end sections, in a path parallel to the direction of said tongues and grooves. The intermediate section B is resinserted in the same manner, after which the remaining parts referred to are replaced in their proper positions and made fast.

It will be noted that the hub sections 24 may slide to a certain extent inward and outward on the inner balls 27, so as to compensate for any dirt or foreign matter which may find its way between the interfitting tongues and grooves 53 and 54, at the time of removal and reinsertion of the wheel. In tightening the axle nuts, there will be no binding action on the bearings.

In order to provide for the use of a pedal sprocket wheel 25 of minimum size, the construction illustrated in Fig. 5 may be resorted to, in which it will be observed that the section C of the hub has its outer end portion reduced and provided with a raceway 55 for the balls 22, while the hub section 24 of the pedal sprocket wheel 25 is extended to encircle the balls 22, the balls being retained in position by a cone 56.

57 designates a dust guard for protecting the inner series of balls 27 and 28.

Where no pedal sprocket wheel is to be employed, the construction illustrated in Fig. 6 may be resorted to, in which case, the inner series of balls 27 and 28 may be done away with, and the sleeve bearing 58 for the balls 22 may be threaded directly on the axle skein 30, the section C of the hub being made proportionately smaller in diameter, and being also extended outside of the balls 22 to provide a steadying or retaining face 59 which runs clear of the outer face of the member 58, but serves to hold the end hub section C in place, when the intermediate hub section B has been removed, thus facilitating the reassembling of the parts.

Where the sectional hub is to be used on a machine, embodying three or four wheels, as in side cars and the like, the construction shown in Fig. 7 may be resorted to, wherein it will be observed that the hub sections A, B and C are all connected up in the manner as hereinabove described, the balls 6 and 22 being the only ones employed, and being supported by inner bearing members 60 and 61, embracing different portions of the axle, which, in this case, is shown as embodying a tapering body or spindle 62. It will be noted in this construction also, that but one bearing takes the end thrust in either direction, the other bearing giving the necessary compensation to free the hub from any binding action.

63 designates a dust guard for protecting the outer bearings 6, and 64 designates a guard for protecting the inner bearings 22. Where the hub illustrated in Fig. 7 is to be driven, a sprocket wheel 65, indicated in section in said Fig. 7, is mounted on the section C of the hub, as will be clearly understood.

Where two or more driving wheels are employed, it is ordinarily necessary to use differential gearing, but this can be overcome with the present construction, by using driving belts, so as to permit one driving wheel to slip to the necessary degree to compensate for unequal speed in the two wheels.

What is claimed is:

1. A demountable wheel for motor driven vehicles, comprising a hub embodying two end sections adapted to be journaled in the wheel frame, an intermediate hub section interposed between said end sections and detachable from the end sections without disturbing the latter, and means for locking all of the hub sections together to turn as one, said locking means comprising interfitting teeth on the abutting faces of the hub sections, and a coupling sleeve passing through the intermediate section and detachably connected to the end sections.

2. A demountable wheel for motor driven vehicles, comprising a hub embodying two end sections adapted to be journaled in the wheel frame, an intermediate hub section interposed between said end sections and detachable from the end sections without disturbing the latter, and means for locking all of the hub sections together to turn as one, said locking means comprising interfitting teeth on the abutting faces of the sections, a coupling sleeve passing through the intermediate section and having a threaded engagement with one end section, a shoulder and a locking pin on said sleeve engaging the other end section.

3. A demountable wheel for motor driven vehicles, comprising a hub embodying two end sections adapted to be journaled in the wheel frame, an intermediate hub section interposed between said end sections and detachable from the end sections without disturbing the latter, means for locking all of the hub sections together to turn as one, said locking means comprising interfitting teeth on the abutting faces of the sections, a coupling sleeve passing through the intermediate section and having a threaded engagement with one end section, and a shoulder and locking pin on said sleeve engaging the other end section, and an axle removably inserted through all of the hub sections and serving to tie the entire hub together, said axle also serving to hold the locking pin against disengagement.

4. A demountable wheel for motor driven vehicles, comprising a hub embodying two end sections adapted to be journaled in the wheel frame, an intermediate hub section interposed between said end sections and detachable from the end sections without disturbing the latter, and means for locking all of the hub sections together to turn as one, said locking means comprising interfitting teeth on the abutting faces of the sections, a removable coupling sleeve passing through the intermediate section and detachably connected with the end sections, an axle passing through all of the sections, and a detachable spacer nut on the axle having a diameter greater than the coupling sleeve.

5. A demountable wheel for motor driven vehicles, comprising a hub embodying two end sections adapted to be journaled in the wheel frame, an intermediate hub section interposed between said end sections and detachable from the end sections without disturbing the latter, and means for locking all of the hub sections together to turn as one, said locking means comprising interfitting teeth on the abutting faces of the hub sections, and a coupling sleeve passing through the intermediate section and detachably connected to the end sections, said sleeve being provided at one end with teeth for engagement with a sleeve turning implement.

6. The combination with a frame of a demountable wheel, comprising a hub, and two end sections journaled in the frame, a removable coupling sleeve with a locking means causing the hub and end sections to revolve together as one, and an axle tying the entire hub and wheel frame together, and a bearing formed in one of the end sections adapted to take the radial load at this end of the hub and also the end thrust of the wheel from either direction.

7. The combination with a frame, of a demountable wheel, comprising a hub, and two end sections journaled in the wheel frame, a removable coupling sleeve with a locking means causing the hub and end sections to revolve together as one, and an axle tying the entire hub and wheel frame together, a clutch, a bearing formed in one of the end sections adapted to take the radial load at this end of the hub and also the end thrust of the wheel from either direction, and a bearing formed in the end section at the opposite end of the hub adapted to take the radial load at that end of the hub and the end thrust induced by the pedal clutch, whereby the intermediate hub section is removable without disturbing said bearings or interfering with the adjustment of the same.

8. The combination with a frame, of a demountable wheel, comprising a hub, and two end sections journaled in the wheel frame, a removable coupling sleeve with a locking means causing the hub and end sections to revolve together as one, and an axle tying the entire hub and wheel frame together, a clutch, a bearing formed in one of the end sections adapted to take the radial load at this end of the hub and also the end thrust of the wheel from either direction, a bearing formed in the end section at the opposite end of the hub adapted to take the radial load at that end of the hub and the end thrust induced by the pedal clutch, a smaller bearing located also at pedal clutch end of the hub forming a support to the main bearing at the same end, when wheel is revolving and pedal sprocket part is stationary and forming a radial bearing when pedal sprocket part is in action, whereby the intermediate hub section is removable without disturbing said bearings or interfering with the adjustment of the same.

9. The combination with a frame, of a demountable wheel, comprising a built-up hub, the revolving parts of which are locked together by a removable sleeve and revolving as one, an axle tying the entire hub together with the wheel frame, a clutch, an anti-friction bearing at one end taking the radial load at that end and also the end thrust from either direction, an anti-friction bearing at the opposite end taking the radial load at that end and the end thrust induced by the action of the clutch arrangement but no end thrust from either direction that is transmitted by the wheel, and an anti-friction bearing also at the end of the hub forming a support to the main bearing at the same end, when the pedal clutch part is stationary and forming a bearing around which this pedal clutch part may revolve while in action, said bearing being adapted to radial loads only, said bearing being movable freely in a telescoping manner, in that the balls of the bearing have a fixed race in one part of the bearing and not in the other, the said bearings in the end sections being so arranged that the intermediate hub section is capable of removal without disturbing said bearings or interfering with the adjustment of the same.

In testimony whereof I affix my signature in presence of two witnesses.

CHARLES W. GERHART.

Witnesses:
W. F. DAGLE,
E. H. GERHART.